W. M. LUTHER.
PARING AND CORING MACHINE.
APPLICATION FILED JUNE 17, 1915.

1,246,127.

Patented Nov. 13, 1917.
3 SHEETS—SHEET 1.

WITNESS

INVENTOR.
WILLIAM M. LUTHER.
BY Baldwin Vale.
ATTORNEY.

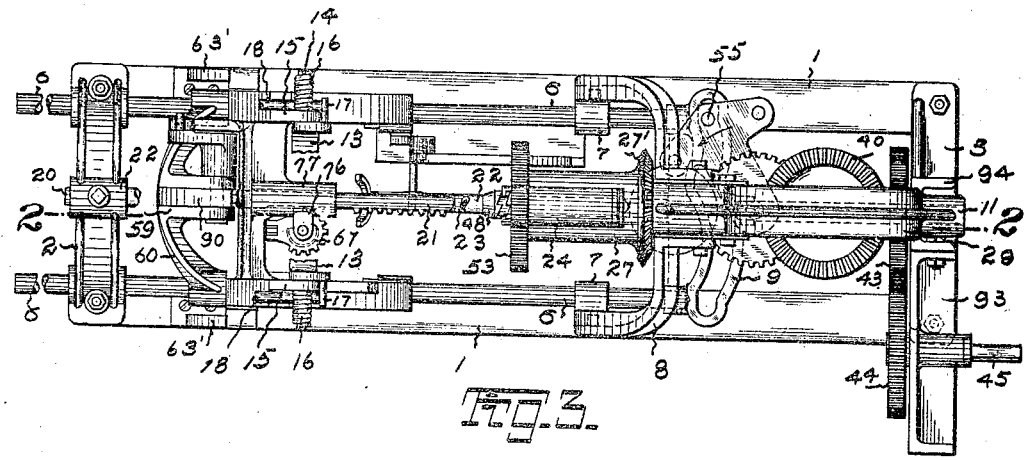
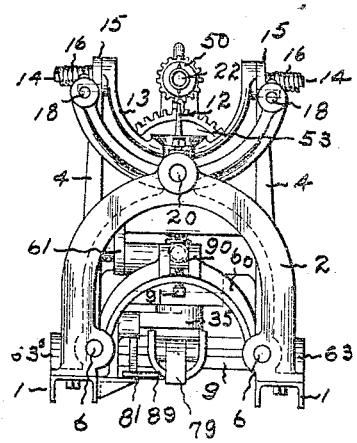 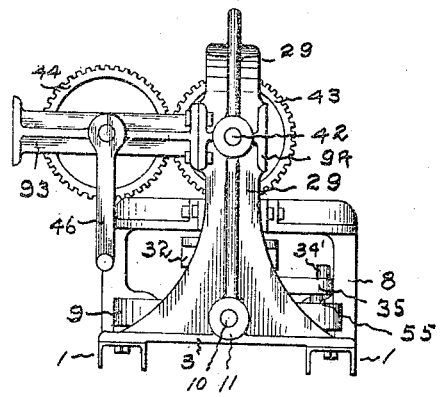

W. M. LUTHER.
PARING AND CORING MACHINE.
APPLICATION FILED JUNE 17, 1915.
1,246,127.
Patented Nov. 13, 1917.
3 SHEETS—SHEET 3.
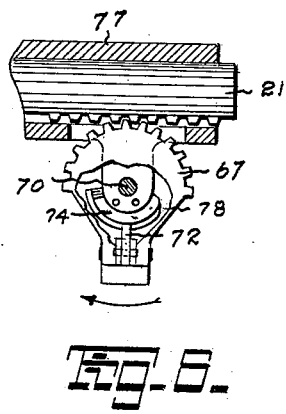
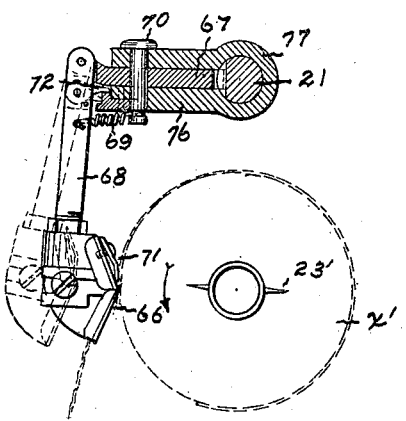
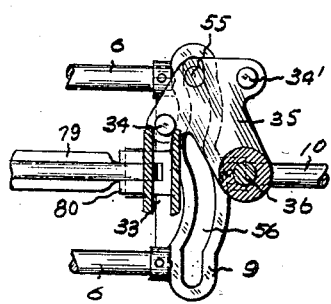
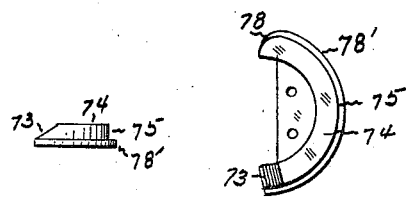
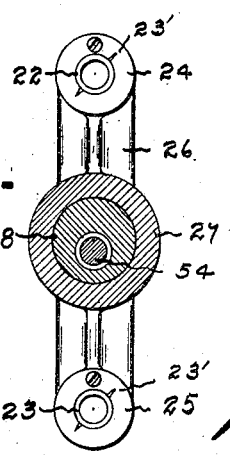
WITNESS
INVENTOR.
WILLIAM M. LUTHER.
BY
ATTORNEY.

UNITED STATES PATENT OFFICE.

WILLIAM M. LUTHER, OF SAN FRANCISCO, CALIFORNIA.

PARING AND CORING MACHINE.

1,246,127.  Specification of Letters Patent.  Patented Nov. 13, 1917.

Application filed June 17, 1915. Serial No. 34,712.

*To all whom it may concern:*

Be it known that I, WILLIAM M. LUTHER, a citizen of the United States, residing in the city and county of San Francisco, State of California, (whose post-office address is 1242 Taylor street,) have invented new and useful Improvements in Paring and Coring Machines, of which the following is a specification.

This invention relates more particularly to machines for paring and coring such fruit as apples, pears, and the like.

Among the objects of this invention are to produce a machine that will automatically remove the core from the fruit, and the peeling from the outside, with the minimum waste of fruit and time in the operation.

To provide a machine that will successfully pare and core relatively soft fruit.

That is adapted to be operated in interconnected, synchronized multiples.

That is simple, direct and positive in its operation, permitting the greatest efficiency of the operator in feeding the fruit thereto.

That will simplify the operation by coring the fruit when it is forced onto the spindle by means of which it is rotated during the paring operation.

Fruit, particularly apples, will vary in different districts. For instance, certain types of apples grown in the eastern part of the United States are hard and firm and will withstand the twisting action of the spindle during the paring operation without mutilation. Certain types of apples produced in the western States are relatively soft, particularly in the cores in which the spindles are apt to rotate and tear out during the resistance of the paring operation, tearing the fruit to pieces, necessitating the paring of the fruit before the core is removed, thus adding complication to the construction and operation of the machine, that is avoided by the present invention.

Other objects and advantages will appear as the description progresses. In the drawing accompanying and forming part of the present specification, to which like reference characters have been applied, a desirable form of putting this invention into practice is shown. I do not wish to be understood as confining this invention to the disclosures made in said drawing and description, as many variations may be introduced, within the spirit of this invention, as defined in the claims succeeding the said description.

In the drawings:—

Fig. 3 is a plan view from above taken from Fig. 1.

Fig. 4 is an end elevation looking toward the feeding end of the machine.

Fig. 5 is a similar view of the same, looking toward the opposite or driving end of the machine.

Fig. 6 is a fragmentary detail of the same looking down upon the paring mechanism.

Fig. 7 is a similar detail of the same in front elevation of the paring knife with its supporting and operating mechanism in cross section, the operation of paring the fruit being illustrated in dotted lines.

Fig. 8 is a detail in side elevation of the cam for controlling the orbit of the paring knife.

Fig. 9 is a plan view from above of the same.

Fig. 10 is a fragmentary detail of the operating mechanism for controlling the timing of the feeding, paring and stripping operations.

Fig. 11 is an enlarged detail of the spindle carriage in cross section on the line 11—11 Fig. 2, illustrating the eccentric mounting for throwing the spindles into and out of mesh with the spindle rotating gear.

Figure 1:
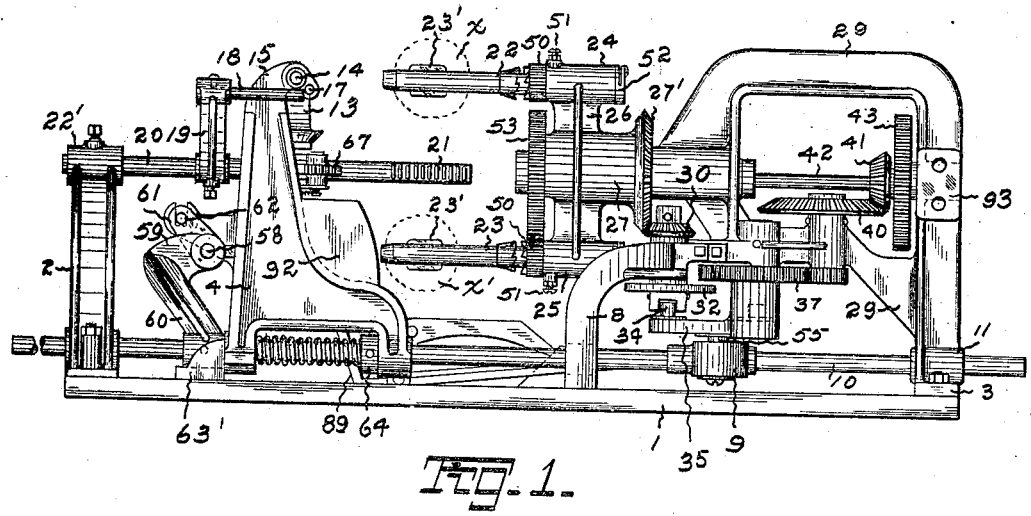
Figure 1 is a side elevation of a paring and coring machine constructed in accordance with this invention.

In detail the construction illustrated in the drawings includes the sills 1—1 preferably of channel iron connected at one end by the arch brace 2, and at the other end by the foot 3, forming a rectangular frame to which the various mechanisms are fixed. The feeding mechanism includes the carriage, having the side plates 4—4 with the lugs 5—5 thereon slidable upon the guide rods 6—6, guided in the arch 2 on opposite sides of the center and in the lugs 7—7 in the uprights 8 fixed to the channels 1—1. The guide rods 6 are fixed in the cross head 9 that has the single guide rod 10 fixed therein and guided in the boss 11 formed on the foot 3. The receiving pin 12 is mounted in the stirrup 13, hung on the trunnions 14—14, journaled in the upper ends 15 of the sides 4 of the carriage. The trunnions 14 are encircled by the spiral springs 16—16, having one end fixed in the trunnions and the opposite ends in the holes provided in the ends 15 of the carriage. The torsion of these springs maintains the stirrup 13 in a position to present the pin 12 in a horizontal position. The ends of the stirrup 13 are provided with the pins 17 projecting outwardly therefrom in the path of the pins 18 adjustably fixed in the yoke 19, that is in turn adjustably fixed on the stem 20 of the rack bar 21 adjustably fixed in the boss 22' of the arch 2. The apple or other fruit X is impaled on the pin 12, the axis of which is in line with the core of the fruit, in position to be forced onto the hollow receiving spindle 22, as hereinafter described.

The spindles 22 and 23 are slidably mounted in the opposite ends 24 and 25 of the spindle arm 26, the hub 27 of which is rotatably mounted on the journal 28, formed on the superframe 29, integrally formed with the foot piece 3 and bolted to the uprights 8, to form an open frame, superstructure, rigidly fixed to the sills 1—1 to form a suitable mounting for the various driving and timing mechanisms. The hub 27 is provided with the bevel gear 27', preferably integrally formed thereon and enmeshed with a driving pinion 30, fixed on the vertical shaft 31, journaled in a boss formed on the superframe 29; the gear ratio being two to one. The disk 32 is fixed on the lower end of the vertical shaft 31 and is provided with the groove 33 (see Fig. 10) formed in the lower side thereof. This groove is engaged by the pins 34 and 34' fixed in the sector 35, that is in turn rotatable upon the stud 36 fixed in the superframe 29. The sector 35 is rotated by the gear 37 enmeshed with the pinion 38 fixed on the end of the shaft 39 journaled in the superframe 29, and rotated by the driven gear 40 fixed thereon. The gear 40 is rotated by the driving pinion 41, fixed on the driven shaft 42, journaled in the superframe and rotated by the driven gear 43, enmeshed with the driving gear 44 mounted on the shaft 45 adapted to be rotated by the crank fixed thereon, or by a suitable pulley, if the machine is mechanically driven.

The spindle arm 26 is held in the vertical position illustrated by the latch 47 resiliently slidable in the superframe 29, and engaging a depression in the disk 32, to maintain the arm 26 in the desired position during the coring and paring operations. Through the driving mechanism the sector 35 receives a continuous rotary motion carrying the pins 34 and 34' into the slot 33. Assuming that the part 33 is in the position shown in Fig. 10 and that the pin 34 is approaching the open end of the slot, the pin will enter the slot and press against the inner face of the side wall of the slot which is further removed from the axis of rotation of the pin so that the slot is gradually turned into a position at right angles to the position shown in Fig. 10. In this central position just mentioned, the pin 34 will be outside of the axis of the part 33 so that the axis of the shaft 31 will lie between the pin 34 and the axis of the shaft 39. Further rotation of the pin 34 will swing the slot until it has exactly the reverse position, the pin 34 pressing against what was previously the outer face of the slot farther away from the axis of rotation of the pin, but which becomes the inner face as soon as the slot passes its central position. The orbit of the pin 34 engaging the transverse slot causes a half rotation of the disk 32, presents the opposite end of the slot to the entry of the pin 34' to complete the rotation of the disk 32, causes the pinion 30 to make one complete revolution, imparts a one-half revolution to the gear 27' which carries the spindle 22 to the present position of the paring spindle 23. See Figs. 1 and 2.

These spindles are provided with the collars 48—48 provided with jaws, to engage clutch jaws 49 on the pinions 50, journaled in the arm 26, and held therein by the set screws 51 threaded in the arms and engaging a groove in the hub of the pinions 50. The spindles 22 and 23 are provided with the set collars 52, adjustable thereon and abutting the ends 24 and 25 of the arm 26 to regulate the disengagement of the clutches 48.

The rotation of the hub 27 by the gear 30, in transposing the position of the spindles as described, brings the orbit of the spindles into conjunction with the eccentric orbit of the gear wheel 53, fixed upon the shaft 54 rotated by the shaft 42. The conjunction of these orbits brings the pinion 50 into mesh with the gear 53, causing the rotation of the spindle 23, and the fruit impaled thereon when the clutch is engaged, as hereinafter described. In like manner as one pinion 50 goes into mesh, the similar pinion on the other spindle disengages from the gear 53.

Figure 2:
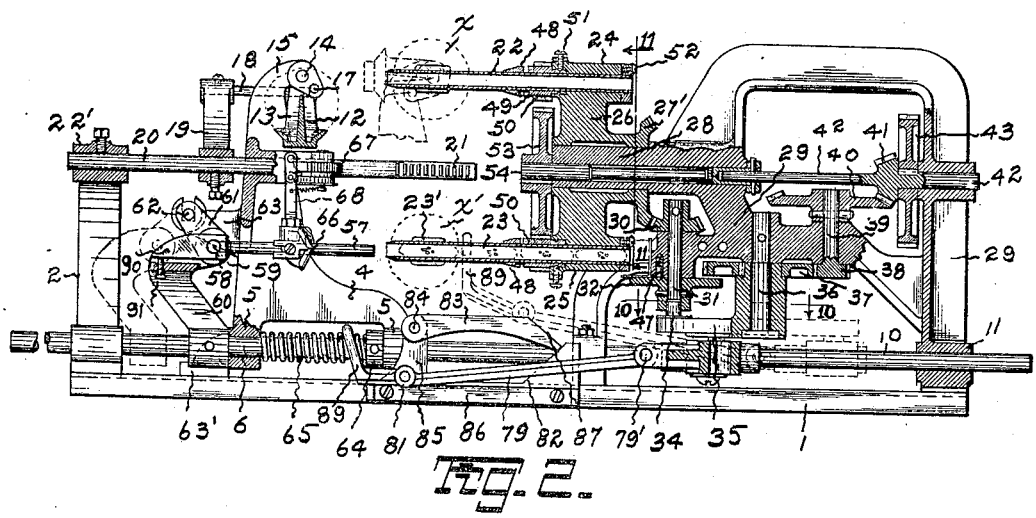
Fig. 2 is a similar view partially in cross section on the line 2—2 Fig. 3.

The rotation of the sector 35 carrying the pin 55 engaging the cam 56 in the cross head 9, (see Fig. 10), forces the cross head back, withdrawing the plunger 57 from the hollow spindle 23 (see Fig. 2). The plunger 57 is pivoted on a pin 58 journaled in the arms 59 forming part of the bracket 60, in turn fixed to the guide rods 6—6. The plunger 57 is provided with the arm 61, having a pin 62 resting in a slot in the bracket 63, extending outward from the side plate 4 of the feed carriage. When the bracket 60 moves backward with the guide rods 6 the arm 61 engages the bracket 63, and tips the plunger downward when the bracket 60 assumes the position shown in dotted lines Fig. 2. The feed carriage 4 is not carried backward by this interval of movement of the guide rod, because of its abutment with the stops 63'—63' fixed on the sills 1—1, the collars 64 fixed on the guide rod 6 compressing the spring 65 between the lug 5 of the carriage and the collar 64.

The continued rotation of the sector 35 that has now passed the center, carries the cross head 9 forward, taking the feed carriage 4 and the bracket 60 with it, forcing the plunger 57 into the hollow spindles 23, carrying the stirrup 13 away from the pins 18, permitting the torsion of the springs 16 to carry the apple X to the horizontal position, to be forced on to the sharpened end of the hollow spindle 22, by the forward movement of the feed carriage, as shown in dotted lines Fig. 1.

The forward movement of the feed carriage carries the paring knife 66 forward into engagement with the now rotating fruit X' impaled on the spindle 23, and prevented from rotating thereon by the fins 23'. The forward movement of the plunger 57 engaging the core within the spindle 23 forces the spindle forward until the clutch 48 engages the clutch in the pinion 50, insuring the positive rotation of the spindle 23. The continued forward movement of the carriage 4 brings the segmental gear 67 into engagement with the rack bar 21, causing the rotation of the segment 67 from which the knife 66 is suspended by the arm 68. The knife is held against the periphery of the fruit by the tension of the spring 69, contracting between the arm 68 and the end of the pin 70, upon which the segment 67 is centered. The guard 71 bearing against the skin of the fruit ahead of the cutting edge, prevents the edge from gouging deeply into the fruit, causing the blade to remove only the skin of the fruit. The rotation of the segment 67 by the rack 21, causes the knife to describe a circle concentric with the axis of the fruit. The edge of the blade pares the fruit clear up to the circumference of the spindles 23 at both ends, eliminating all necessity for hand paring, and finishing. The fruit need not be touched by human hands after being fed to the machine.

To prevent the blade 66 from gouging into the now completely peeled fruit during the return stroke of the cross head, the arm 68 is provided with the trip 72, that rides up the incline 73, to the top 74 of the cam 75, fixed on the bracket 76, extending outward from the guide 77 formed on the feeder carriage. During the peeling interval the trip 72 does not influence the orbit of the knife, but on the return stroke it drops off of the upper face 74 of the cam at 78 and rides back on the flange 78', the end of the trip 72 bearing against the cam 75 to hold the knife edge clear of the fruit.

The stripper 79 is pivoted on the pin 79' in a bracket 80 formed on the yoke 9. When the yoke moves forward in the charging and paring interval, the roller 81 journaled on the stripper moves forward and rides up the incline 82, lifting the cam track 83 pivoted at 84, on a bracket 85 formed on the plate 86 secured to the inside edge of the adjacent sills 1. On the return stroke the roller 81 rides up the incline 87, elevating the yoke 89 formed on the end of the stripper, so that the opposite bars of the yoke straddle the spindle 23, and abut the now completely pared fruit, the continuous rearward travel of the yoke declutching the jaws 48 and forcing the fruit off of the spindle and onto the plunger 57, that is held in the horizontal position within the spindle 23 by the rearward extension 90 abutting the adjustment screw 91 threaded in the bracket 60. The tipping downward of the plunger 57 as previously described delivers the fruit to a suitable bin or conveyer beneath the machine.

The clean uncontaminated fruit is delivered from the machine at one point, the parings at another behind the shield 92, and the cores are successively pushed out of the spindle by the entrance of the plunger 57.

It is the intention to bolt a multiple of these machines together in groups of four, that number being about the limit that the operator can feed. The various machines in the group are synchronized in their operations so as to come to the feeding position as in Fig. 2, alternately so that the operator can place the group on the spikes 12 with the least number of motions and physical effort.

The machines are bolted together by the connecting brackets 93 in which the driving shaft 45 is journaled. (See Fig. 3.) The end of the bracket 93 is bolted to the faced lug 94 of the contiguous machine, the driving sprocket 44 enmeshing with the driven sprocket 43 of the companion machines. Any number of machines may be thus joined together and driven from a single source of power.

Having thus described this invention what I claim and desire to secure by Letters Patent is:—

1. A paring machine including a frame; a guide slidable in said frame; a carriage resiliently slidable on said guide; abutments on said frame in the path of said carriage; a feeding and a paring mechanism on said carriage; a plurality of spindles mounted upon an arm rotatable on said frame; means for rotating said arm and said spindle; means for synchronously moving said carriage rotating said arm, and operating said paring mechanism.

2. A paring machine including a frame; a guide slidable in said frame; a carriage mounted on said guide; a feeding and a paring mechanism on said carriage; an arm rotatable on said frame; a plurality of spindles on said arm; means for rotating said arm and said spindles; means for alternately holding said spindles in alinement with said feeding and paring mechanism, and a stripper on said carriage synchronized with said paring mechanism.

In testimony whereof I have hereunto signed my name this 22nd day of May, 1915.

WILLIAM M. LUTHER.

Witness:
BALDWIN VALE.